(12) United States Patent
Diamond

(10) Patent No.: US 10,329,840 B2
(45) Date of Patent: Jun. 25, 2019

(54) CHILD SAFE OPERATING WAND FOR A BLIND

(71) Applicant: Fourds Limited, Magherafelt (GB)

(72) Inventor: Cormac Diamond, Draperstown (GB)

(73) Assignee: Fourds Limited, Northern Ireland (GB)

(*) Notice: Subject to any disclaimer, the term of this patent is extended or adjusted under 35 U.S.C. 154(b) by 311 days.

(21) Appl. No.: 15/316,678

(22) PCT Filed: Jun. 5, 2015

(86) PCT No.: PCT/EP2015/062590
§ 371 (c)(1),
(2) Date: Dec. 6, 2016

(87) PCT Pub. No.: WO2015/185728
PCT Pub. Date: Dec. 10, 2015

(65) Prior Publication Data
US 2017/0145744 A1 May 25, 2017

(30) Foreign Application Priority Data

Jun. 6, 2014 (GB) .................................. 1410059.8

(51) Int. Cl.
*E06B 9/42* (2006.01)
*E06B 9/78* (2006.01)
(Continued)

(52) U.S. Cl.
CPC ............. *E06B 9/78* (2013.01); *E06B 9/322* (2013.01); *E06B 9/326* (2013.01); *E06B 9/42* (2013.01);
(Continued)

(58) Field of Classification Search
CPC .. E06B 9/322; E06B 9/326; E06B 2009/3222; E06B 9/42; E06B 9/78;
(Continued)

(56) References Cited

U.S. PATENT DOCUMENTS 2,468,453 A * 4/1949 Mallentjer ........... A47H 5/0325
160/331
3,123,182 A * 3/1964 Malone .................. A47H 5/032
160/178.1 R
(Continued)

FOREIGN PATENT DOCUMENTS

| GB | 2496639 A | 5/2013 |
| KR | 1020130005980 A | 1/2013 |
| WO | 2012125036 A1 | 9/2012 |

*Primary Examiner* — Katherine W Mitchell
*Assistant Examiner* — Abe Massad
(74) *Attorney, Agent, or Firm* — Standley Law Group LLP

(57) ABSTRACT

An operating mechanism is provided for a screen assembly having an elongate endless pull cord hanging from the screen assembly in a loop. The operating mechanism has a housing having an opening at an upper end thereof. At least a lower portion of the pull cord can pass into the housing to be enclosed therein. A guide means for guiding passage of the pull cord through the housing. The guide means has a locking means adapted to selectively restrain first or second sides of a loop defined by the pull cord. The guide means includes a cord-retaining member engaging a lower end of the looped pull cord. The cord-retaining member is moveable within the housing between vertically spaced first and second positions, the second position being above the first position, the cord-retaining member being biased towards the first position by biasing means. The housing may be displaced downwardly with respect to the pull cord by upward movement of the cord-retaining member between the positions against the force of the biasing means.

19 Claims, 17 Drawing Sheets

(51) Int. Cl.
  *E06B 9/326* (2006.01)
  *E06B 9/322* (2006.01)
  *F16H 19/06* (2006.01)
  *F16H 25/18* (2006.01)
  *F16H 31/00* (2006.01)
  *F16H 57/035* (2012.01)

(52) U.S. Cl.
  CPC ......... *F16H 19/0645* (2013.01); *F16H 25/18* (2013.01); *F16H 31/001* (2013.01); *F16H 57/035* (2013.01); *E06B 2009/3222* (2013.01); *F16H 2019/0681* (2013.01)

(58) Field of Classification Search
  CPC ...... F16H 57/035; F16H 31/001; F16H 25/18; F16H 19/0645; F16H 2019/0681
  See application file for complete search history.

(56) References Cited

U.S. PATENT DOCUMENTS

| | | | |
|---|---|---|---|
| 4,813,469 A | 3/1989 | Scott | |
| 5,465,779 A | 11/1995 | Rozon | |
| 5,595,232 A * | 1/1997 | Benthin | E06B 9/361 160/178.1 R |
| 6,189,595 B1 * | 2/2001 | Lee | E06B 9/303 160/168.1 R |
| 7,360,576 B2 * | 4/2008 | Lin | A47H 5/0325 160/168.1 P |
| 8,286,686 B2 | 10/2012 | Cannaverde | |
| 8,505,609 B2 | 8/2013 | Huang | |
| 8,662,136 B2 * | 3/2014 | Nevins | F16G 11/00 160/173 R |
| 8,763,675 B2 * | 7/2014 | Zhu | E06B 9/32 160/321 |
| 9,091,117 B2 | 7/2015 | Ng | |
| 9,528,318 B2 * | 12/2016 | Huang | E06B 9/262 |
| 2012/0090795 A1 * | 4/2012 | Kirby | E06B 9/40 160/307 |
| 2013/0306253 A1 * | 11/2013 | Ho | E06B 9/326 160/168.1 R |

* cited by examiner

CHILD SAFE OPERATING WAND FOR A BLIND

This invention relates to an operating mechanism for a screen assembly, and in particular to an operating mechanism for enclosing the cord of a screen assembly in order to prevent injuries to young children.

Windows are typically provided with screen assemblies fitted to the inside of the frame of the window opening, typically fixed to the upper face of the window opening or between the sides of the window opening adjacent the upper face thereof, for selectively obscuring the window. In the case of a roller blind, such screen assemblies typically have a roller mounted at an upper side of the frame around which a suitable screen is wound. The screen may be lowered and raised by rotating the roller via an endless cord, chain or web (hereinafter referred to as a "pull cord") formed into a loop and guided over a pulley mounted on one end of the roller such that the pull cord hangs down from the roller. Many other window coverings utilise a closed, or continuous pull cord arranged in a loop for controlling an operating mechanism of the window covering, whereby pulling on one side of the pull cord rotates a drive wheel of the respective operating mechanism in a desired direction, for example to raise or lower or open or close the window covering or set the window covering in any desired configuration.

Such looped pull cords must be of sufficient length to be easily accessible to the user. However, such pull cords present various hazards, dangers, and risks because of the closed, or continuous, loop nature of the pull cords. In particular, such pull cords pose a significant threat to young children, who can all too easily become entangled in them, potentially resulting in strangulation. It has been reported that at least 6 children lose their lives each year in the UK as a result.

These concerns have resulted in a new European Standard, BS EN 13120:2009, setting out requirements for warning labels and steps required to mitigate such risks, including recommending the use of tensioning devices or an alternative blind operating system that does not require the use of exposed chains or cords.

There are devices available for retaining a lower end of the pull cord loop to keep the pull cord taut by means of a pulley or bracket affixed to an adjacent side of the window opening. However, while such devices can be effective, the take up by consumers is poor, possibly because of the effort needed to install such devices, as well as some impairment to the ease of operation of the screen operating mechanism. Examples of such known retaining or tensioning devices are shown in US 2012/255686 and US 2012/094794.

It is also known to enclose at least a portion of the pull cord in a hanging housing. However, such devices restrict the ease of use of the pull cord because they inherently restrict access to the cord. An example of such a known device is shown in GB 2 496 639.

An object of the present invention is to provide an improved operating mechanism for a screen assembly that prevents the risk of injuries to young children while providing a reliable and easy to use means for operating the screen assembly.

According to the present invention there is provided an operating mechanism for a screen assembly of the type having an elongate endless pull cord hanging from the screen assembly in a loop, said operating mechanism comprising a housing having an opening at an upper end whereby at least a lower portion of the pull cord can pass into the housing to be enclosed therein, the housing incorporating guide means for guiding passage of the pull cord through the housing, said guide means incorporating locking means adapted to selectively restrain the first or second side of a loop defined by the pull cord within the housing as the housing is pulled downwardly with respect to the screen assembly, said guide means comprising a first sprocket rotatably mounted within the housing adapted to engage a first portion of the pull cord on a first side of the loop defined thereby and a second sprocket rotatably mounted within the housing adapted to engage a second portion of the pull cord on a second side of the loop defined thereby, the locking means being adjustably configurable between a first state, wherein the locking means prevents rotation of the first sprocket as the housing is displaced downwardly with respect to the pull cord, causing the housing to pull on said first side of the loop defined by the pull cord, and a second state, wherein the locking means prevents rotation of the second sprocket as the housing is displaced downwardly with respect to the pull cord, causing the housing to pull on the second side of the loop defined by the pull cord, such that reciprocating motion of the housing with respect to the screen assembly causes rotation of the operating mechanism of the screen assembly.

In a preferred embodiment the guide means includes a cord retaining member engaging a lower end of the looped pull cord, said cord retaining member being moveable within the housing between vertically spaced first and second positions, said second position being above said first position, the cord retaining member being biased towards said first position by biasing means, whereby the housing may be displaced downwardly with respect to the pull cord by virtue of upward movement of the cord retaining member between its first and second positions within the housing against the force of the biasing means.

Said cord retaining member may comprise a pulley around which the lower end of the loop defined by the cord passes or may comprise a loop or hook engaging a lower end of the loop defined by the cord.

Said biasing means may comprise an elongate elastic member, such as a tension spring, compression spring or an elastic band, said cord retaining member being attached to or being defined by a free end of said elongate elastic member. In one embodiment the elastic member may comprise a tension spring or elastic band located within the housing beneath the cord retaining member, a lower end of said elastic member being secured within the housing and an upper end of the elastic member defining or being connected to said cord retaining member.

Preferably said housing comprises an upper part and a lower part, said lower part being rotatable with respect to said upper part in order to adjust the locking means between its first and second states. In one embodiment said first and second sprockets and said locking means may be housed within the upper part of the housing and said pull cord retaining member and biasing means may be housed within said lower part of the housing.

The upper part of the housing may be adapted to engage the screen assembly such that a twisting torque applied to the lower part of the housing can be transferred to the screen assembly in order to facilitate control of the locking means.

Said first and second sprockets may be arranged coaxially in side by side relationship within the housing.

In one embodiment the first portion of the pull cord may pass around the first sprocket from a first side of the housing to a second side of the housing, said second portion of the pull cord passing around the second sprocket from the second side of the housing to the first side of the housing.

Each of said first and seconds sprockets may be provided a guide channel provided around the outer periphery thereof for receiving said pull cord therein. Said guide channel of each sprocket may be provided with circumferentially arranged formations to grip the pull cord.

Said locking means is preferably arranged to selectively engage teeth provided around each of said first and second sprockets. In one embodiment the locking means may comprise respective latching members, each latching member having a head portion adapted to engage the teeth of a respective one of the first and second sprockets when in a latching position. The head portion of each latching member may be shaped to engage a lower side of a respective tooth of the respective sprocket. Each latching member may be moveable between a first position, wherein the head portion of the respective latching member engages the teeth of the respective sprocket, and a second position, wherein the head portion of the respective latching member is spaced from the respective sprocket, each latching member being resiliently biased towards its first position by a biasing means.

In a preferred embodiment each latching member is arranged such that rotation of the respective sprocket in a first direction is prevented by the abutment of the latching member with the teeth of the respective sprocket while rotation of the respective sprocket in a second, opposite direction causes the teeth of the sprocket to displace the latching member outwardly with respect to the sprocket against the force of said biasing means, allowing rotation of the respective sprocket in said second direction.

A shock absorbing or damping means may be provided for slowing movement of the cord retaining member as it approaches its first position under the action of the biasing means in order to prevent forceful impact of the housing with the screen assembly.

An operating mechanism for a screen assembly in accordance with an embodiment of the present invention will now be described by way of example only, with reference to the accompanying drawings, in which.

Figure 1:
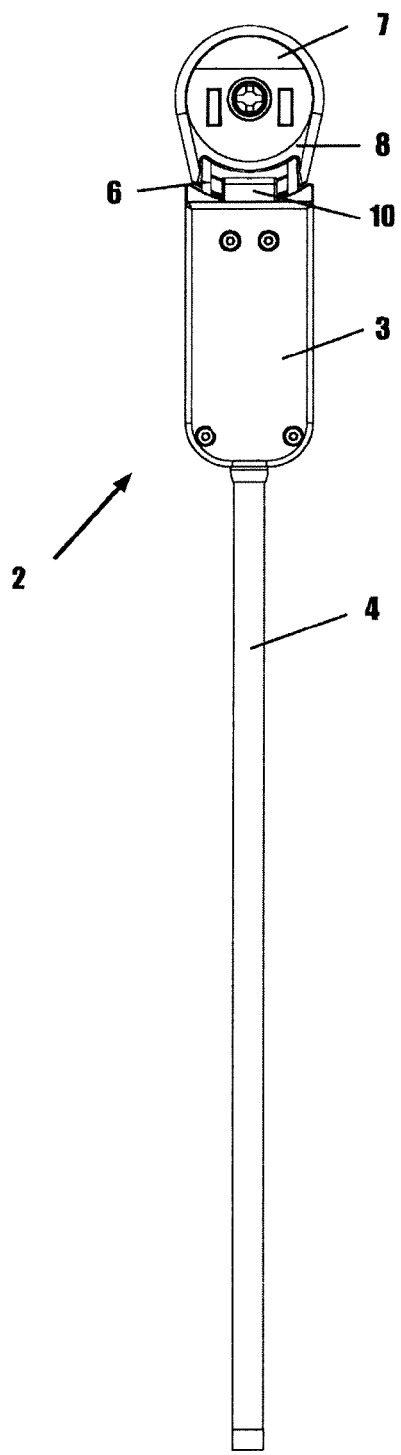
FIG. 1 is a side view of an operating mechanism for a screen assembly.
Figure 2:
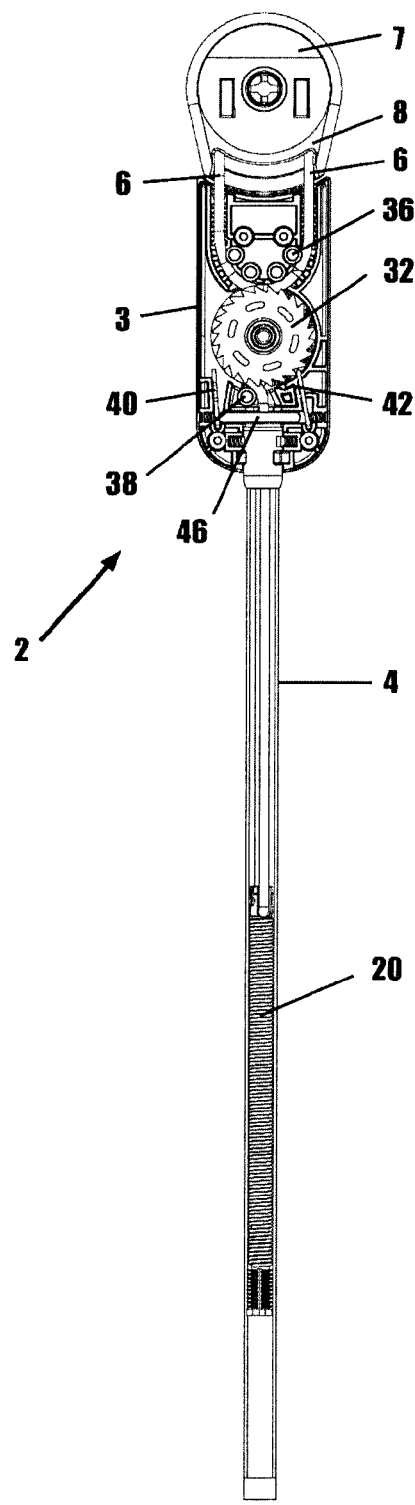
FIG. 2 is a longitudinal sectional view of the operating mechanism of FIG. 1 with the locking mechanism in a first state.
Figure 3:
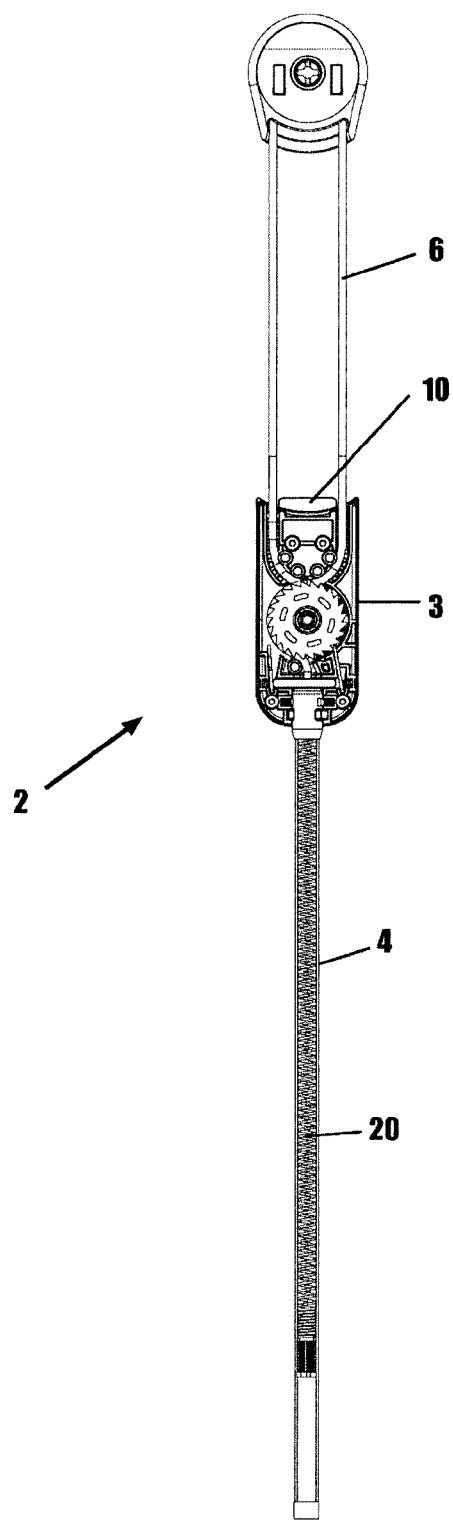
FIG. 3 is a longitudinal sectional view of the operating mechanism of FIG. 1 with an outer side of the housing omitted for clarity and with the housing pulled downwardly to its lower position.
Figure 4:
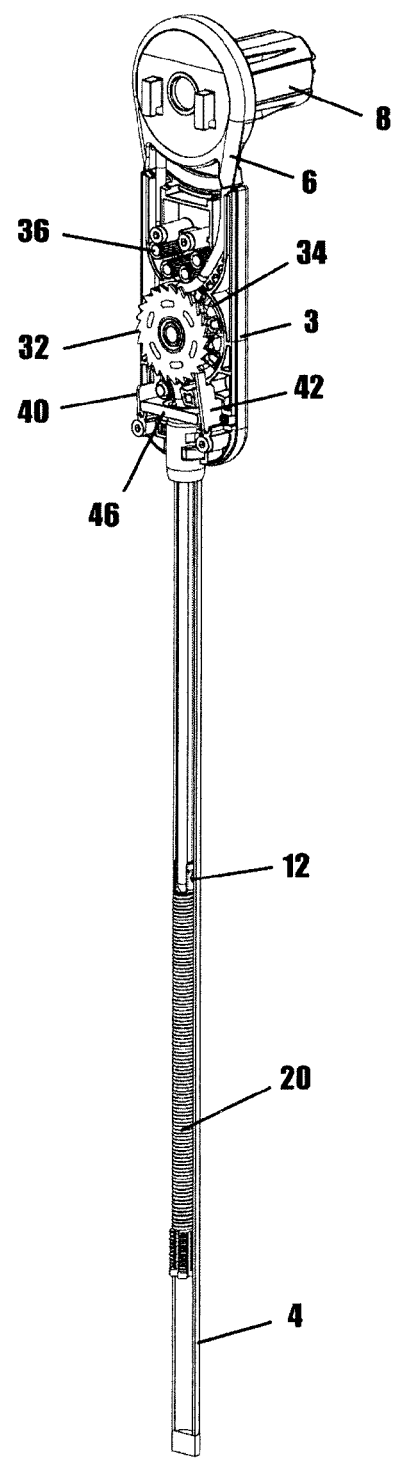
FIG. 4 is a perspective longitudinal sectional view of the operating mechanism of FIG. 1 with the locking mechanism in a first state.
Figure 5:
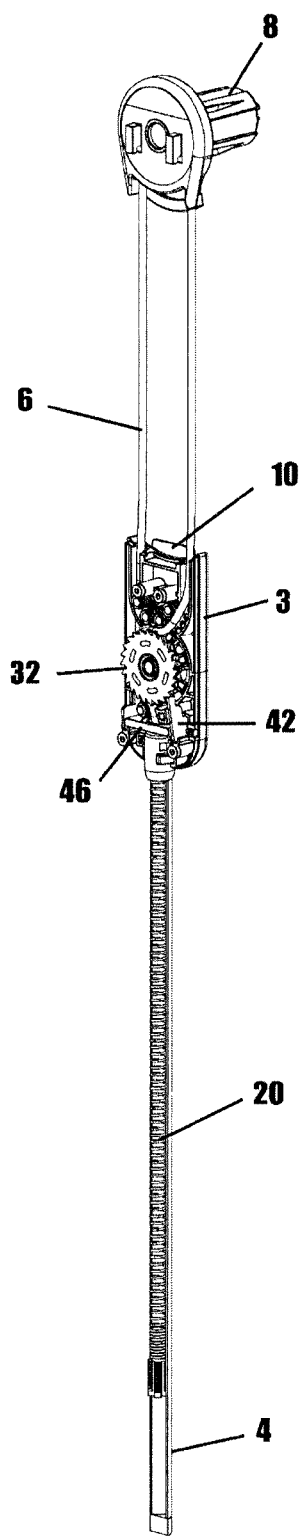
FIG. 5 is a perspective longitudinal sectional view of the operating mechanism of FIG. 1 with the housing pulled downwardly to its lower position.
Figure 6:
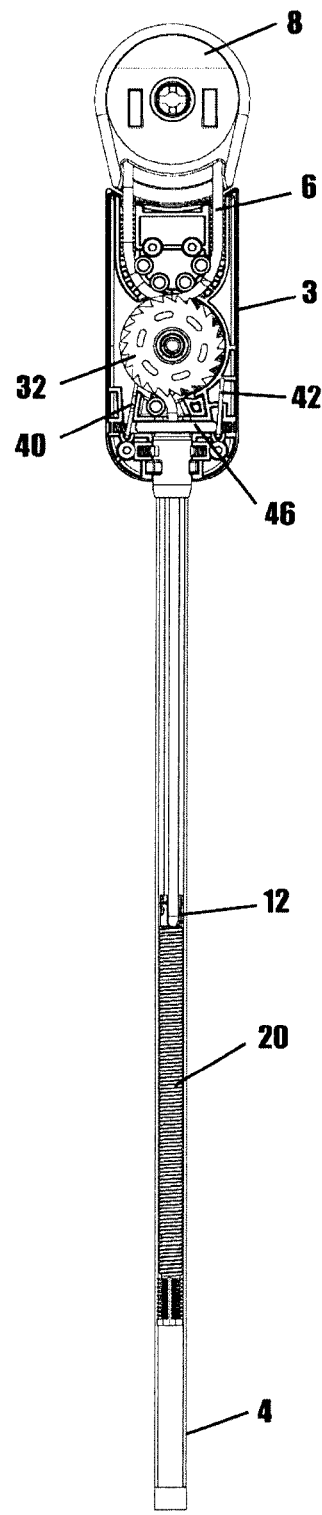
FIG. 6 is a longitudinal sectional view of the operating mechanism of FIG. 1 with the locking mechanism in a second state.
Figure 7:
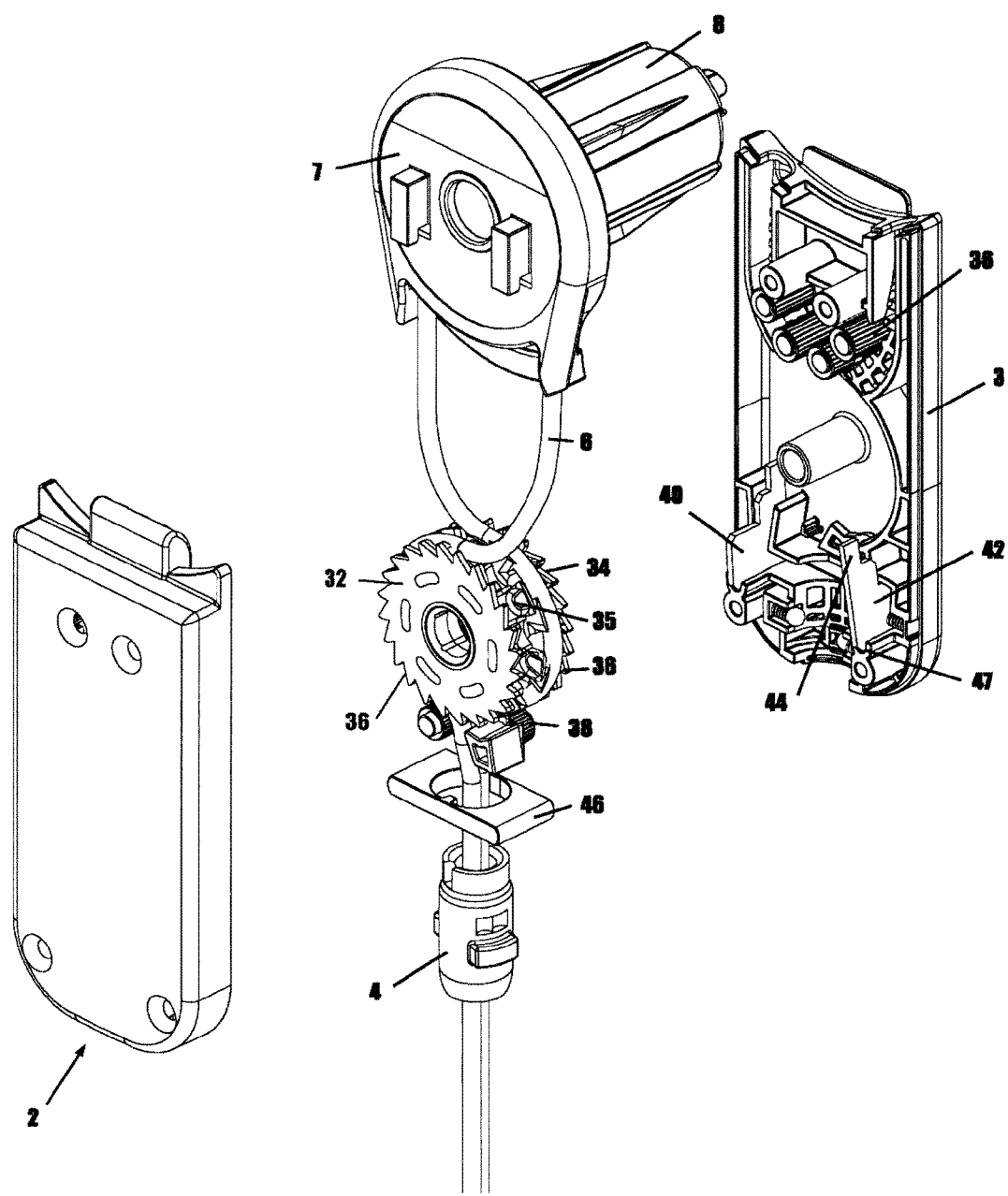
FIG. 7 is an exploded perspective view of an upper part of the operating mechanism of FIG. 1.
Figure 8:
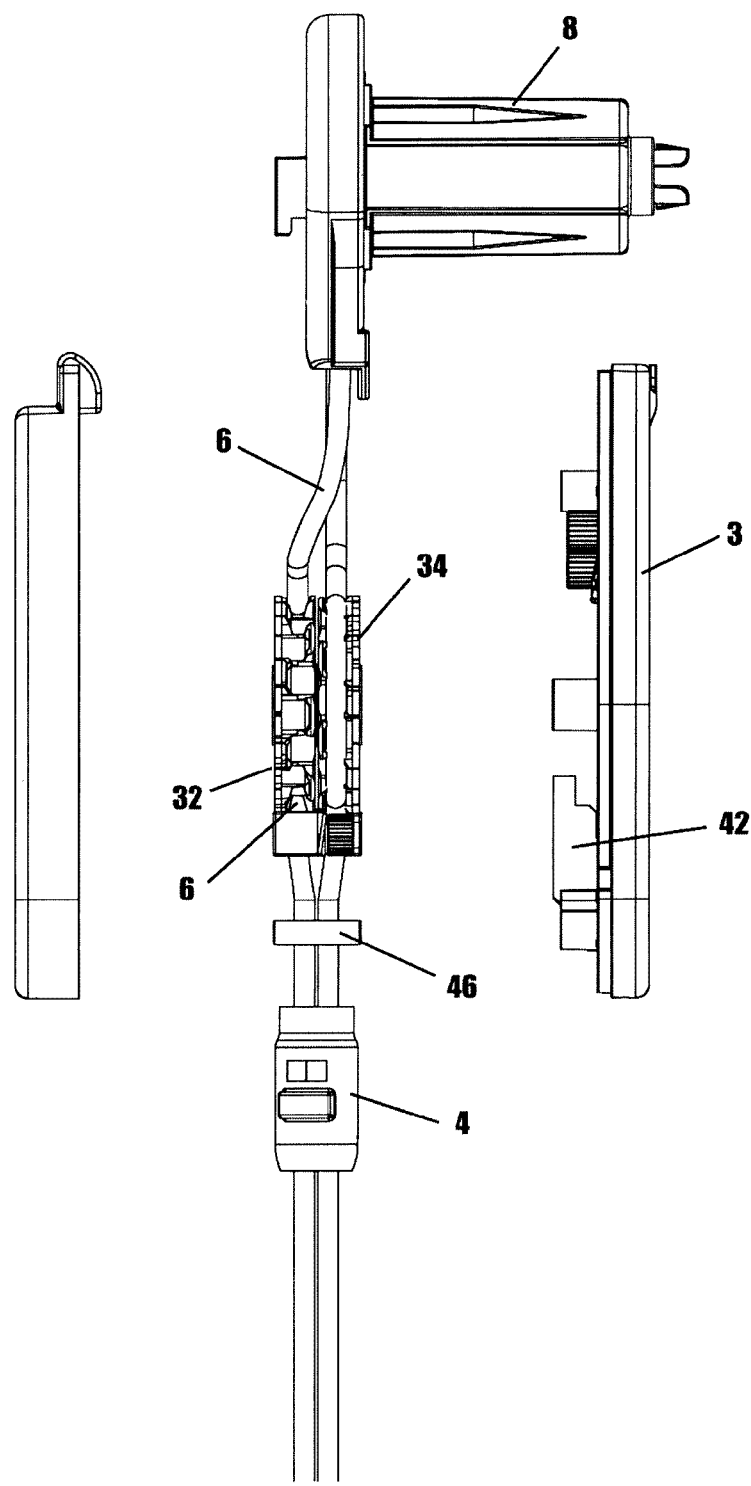
FIG. 8 is an exploded side view of the upper part of the operating mechanism of FIG. 1.

As illustrated in the drawings, an operating mechanism for a screen assembly in accordance with an embodiment of the present invention comprises an elongate hollow housing 2 in the form of a wand having an opening at an upper end through which is passed a pull cord 6 of a screen assembly such that the housing 2 encloses the pull cord, as shown in FIG. 1, when the housing 2 is at an at rest position engaging and depending from an upper pulley assembly 8 of the screen assembly. The width of the housing 2 is preferably substantially equal to the width of the upper pulley assembly 8 so that the housing 2 may rest between a screen of the screen assembly and a side of the window opening within which the screen assembly is located.

In the embodiment shown, the screen assembly comprises a roller blind comprising a web of material wound around a roller arranged to be mounted in an upper side of a window opening, an upper pulley 7 being mounted on one end of the roller around which is wound the pull cord 6, which may be an endless cord, chain or similar looped elongate flexible member. In a preferred embodiment the pull cord 6 comprises a smooth cord, such arrangement providing a smooth and quiet operation. Alternatively the pull cord 6 may comprise a beaded cord or chain.

An upper end of an upper portion 3 of the housing 2 is adapted to engage the upper pulley assembly 8 of the screen assembly such that a twisting torque applied to a lower end of the housing 2 can be transferred to the upper pulley assembly 8 in order to facilitate adjustment the operating mechanism, as will be described below in more detail.

A guide pulley 12 is mounted within a tubular lower portion 4 of the housing 2 around which is received lower end of the pull cord 6, said tubular lower portion 4 of the housing 2 depending from the upper portion 3 and being rotatably coupled with the upper portion 3 to allow the lower portion 4 to be twisted with respect to the upper portion to adjust the operating mechanism to raise or lower the screen. The guide pulley 12 is slideably mounted within the tubular lower portion 4 of the housing 2 such that the guide pulley 12 is vertically moveable within the lower portion 4 of the housing 2.

A biasing means in the form of a return spring 20 is located within the lower portion 4 of the housing 2, the guide pulley 12 being preferably attached to an upper end of the spring 20 to bias the guide pulley 12 in a downwards direction within the lower portion 4 of the housing 2 in order to bias the housing 2 upwardly into contact with the screen pulley assembly 8. A lower end of the spring 20 may be secured within the lower portion 4 of the housing 2. Alternatively the return spring 20 may comprise a compression spring and may be located above the guide pulley 12 to push the guide pulley 12 in a downwards direction within the lower portion 4 of the housing 2. It is envisaged that the return spring may be replaced by an elongate elastic member, such as an elastic band. The guide pulley 12 may be omitted and the lower end of the loop defined by the cord 6 may be attached directly to an upper end of the spring, for example via a hook or loop formed at an upper end of the spring. However, the use of a rotatably mounted guide pulley 12 for guiding the lower end of the cord is preferred to avoid wear of the cord 6.

Figure 9:
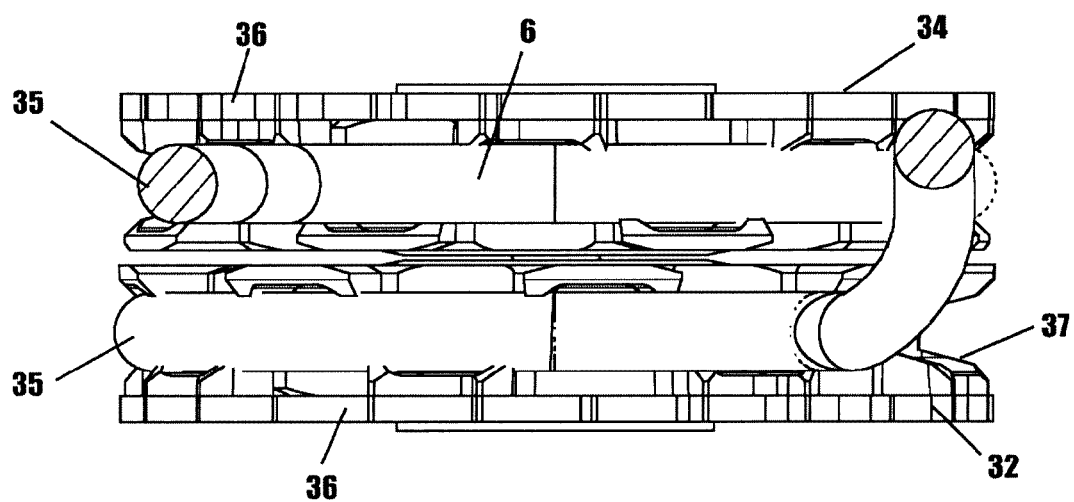
FIG. 9 is a detailed part sectional view of the guide sprockets of the operating mechanism of FIG. 1.
Figure 10:
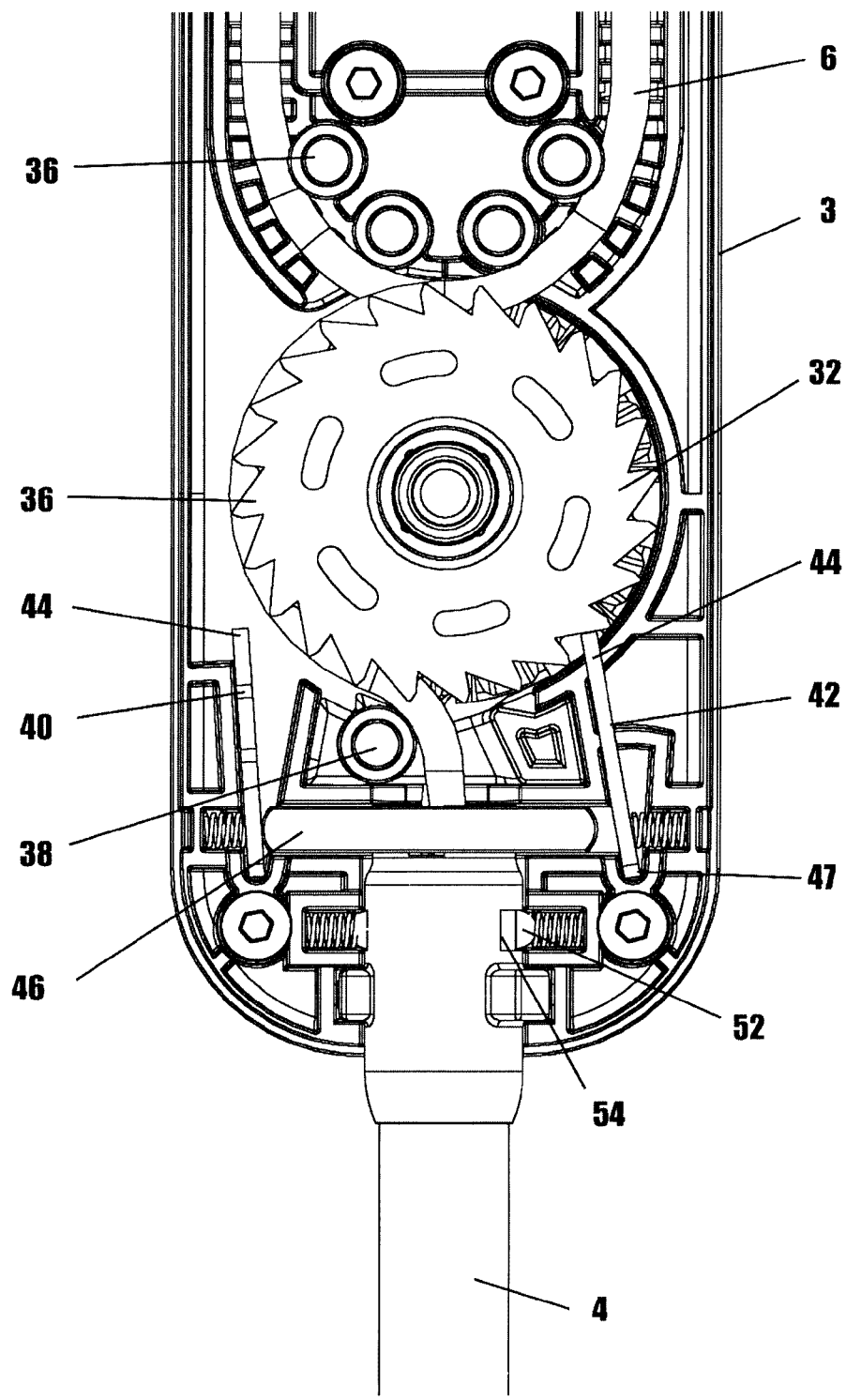
FIG. 10 is a detailed sectional view of the operating mechanism of FIG. 1 with the locking mechanism in its first state.
Figure 11:
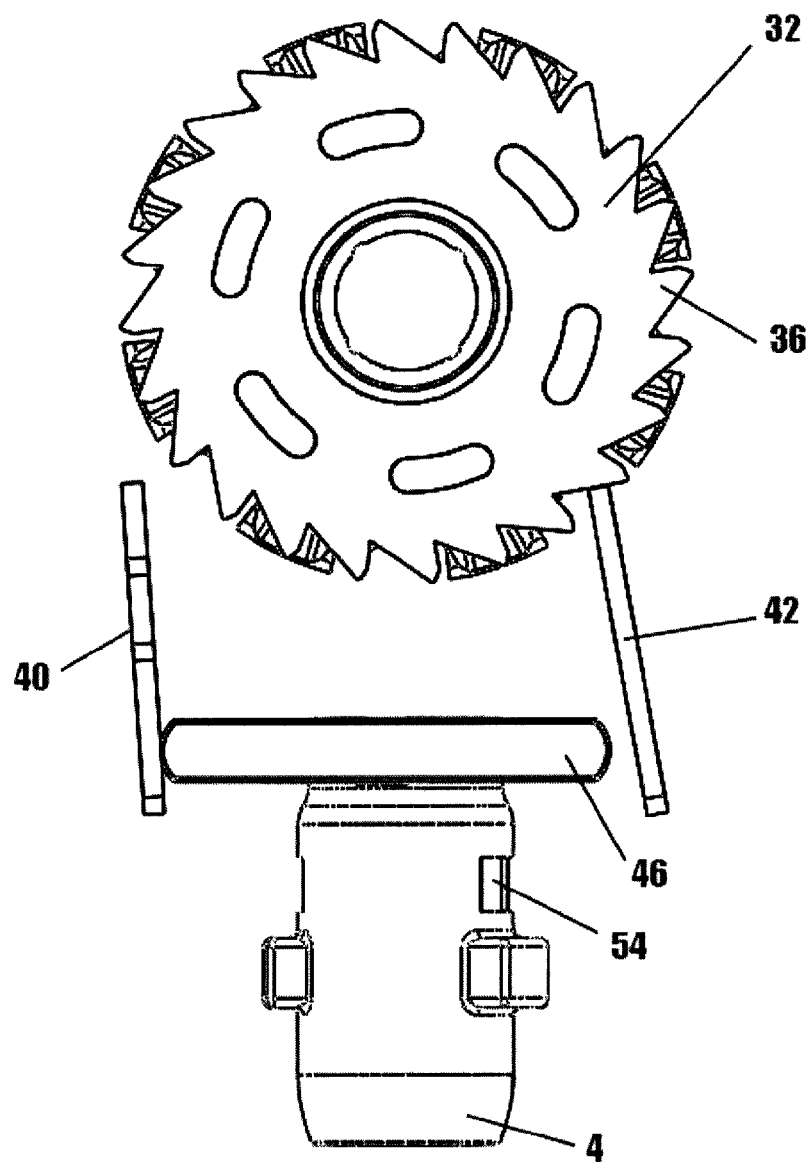
FIG. 11 is a detailed sectional view of the operating mechanism of FIG. 1 with the locking mechanism in its first state with parts omitted for clarity.
Figure 12:
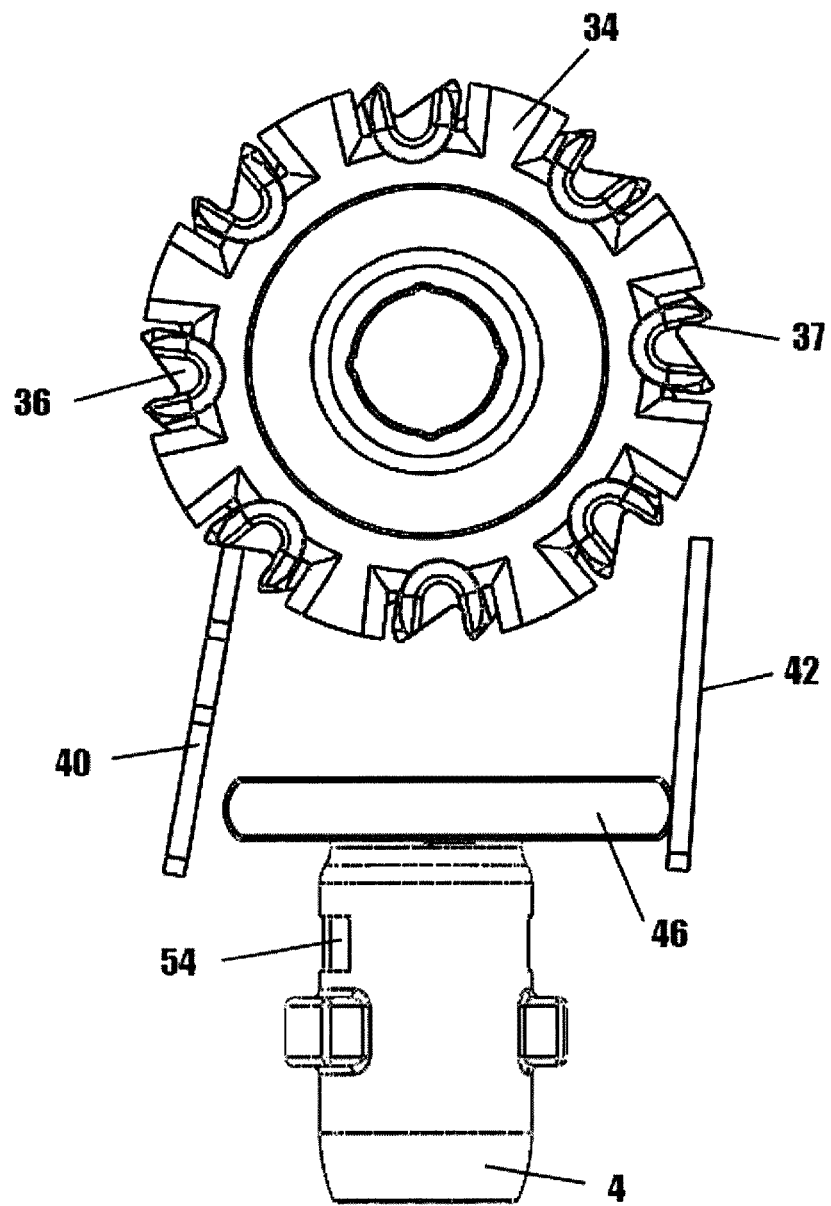
FIG. 12 is a detailed sectional view of the operating mechanism of FIG. 1 with the locking mechanism in its second state with parts omitted for clarity.
Figure 13:
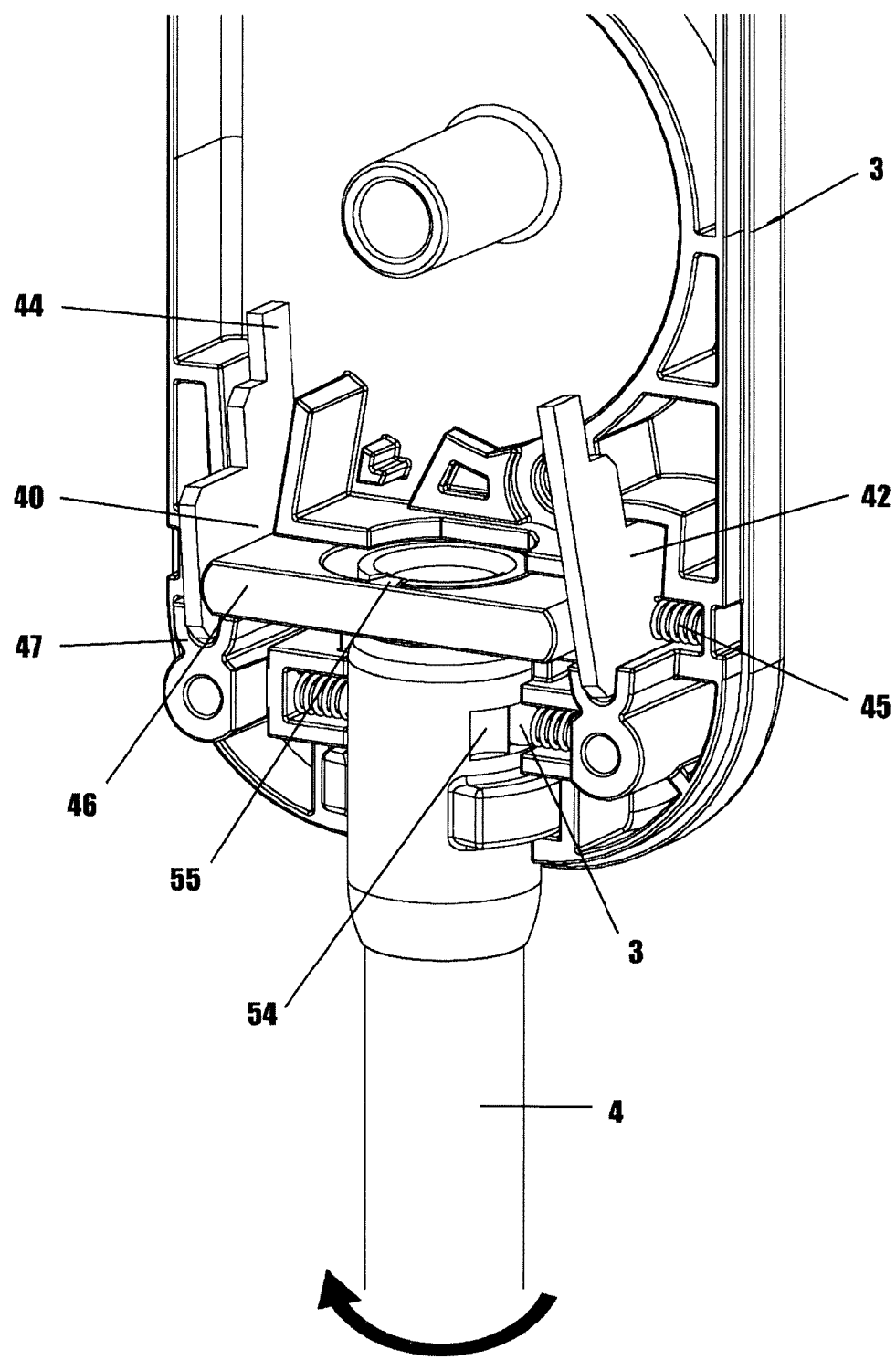
FIG. 13 is a detailed perspective view of the operating mechanism of FIG. 1 with the locking mechanism in its first state with parts omitted for clarity.
Figure 14:
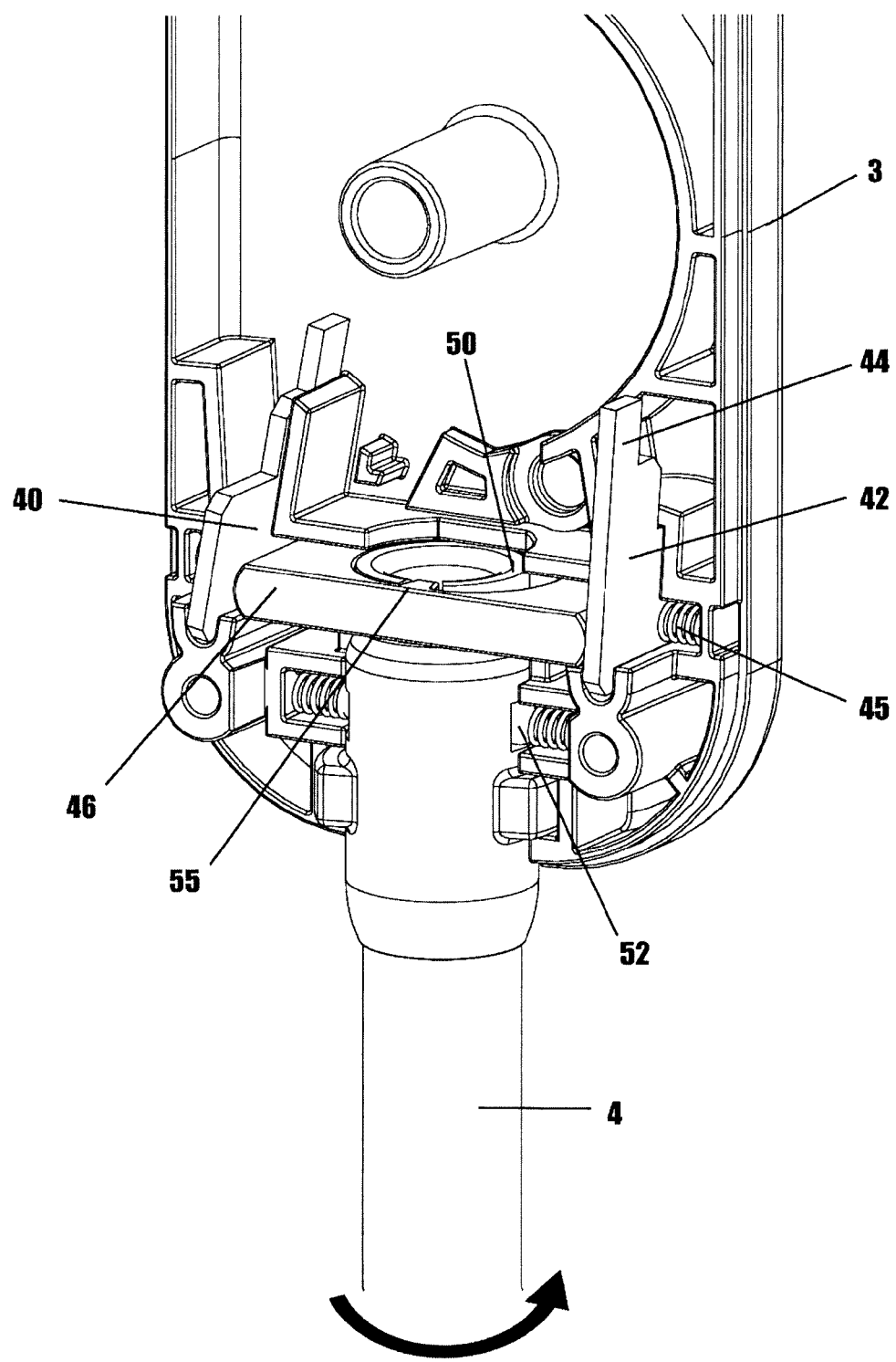
FIG. 14 is a detailed perspective view of the operating mechanism of FIG. 1 with the locking mechanism in its second state with parts omitted for clarity.
Figure 15:
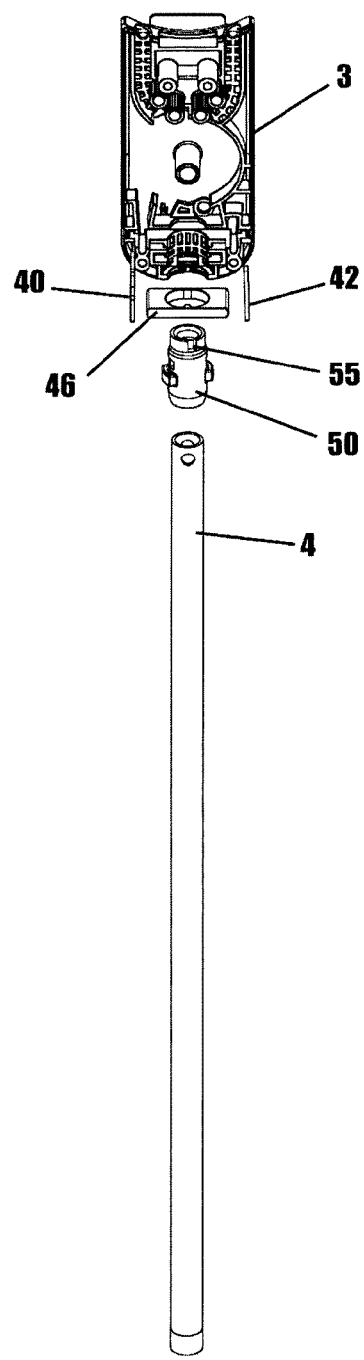
FIG. 15 is an exploded view of the operating mechanism of FIG. 1 with parts omitted for clarity.
Figure 16:
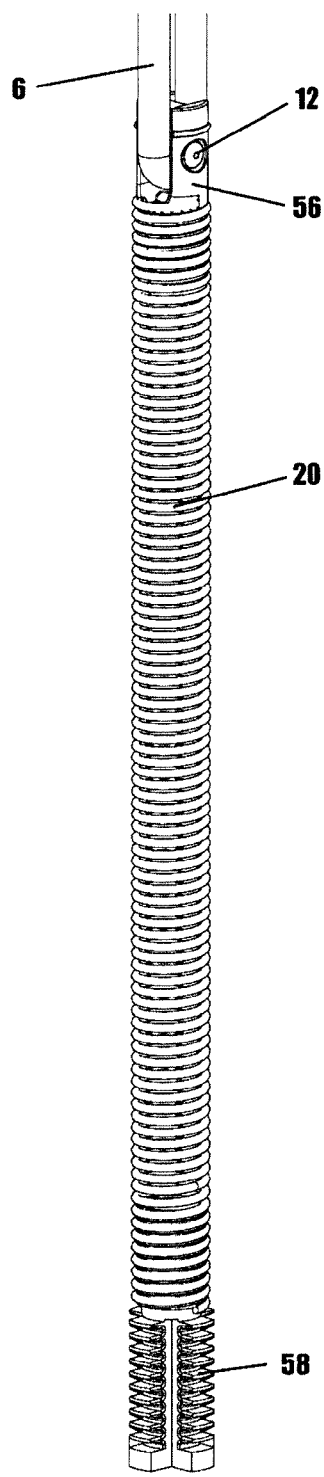
FIG. 16 is a detailed view of the guide pulley and return spring of the operating mechanism of FIG. 1.
Figure 17:
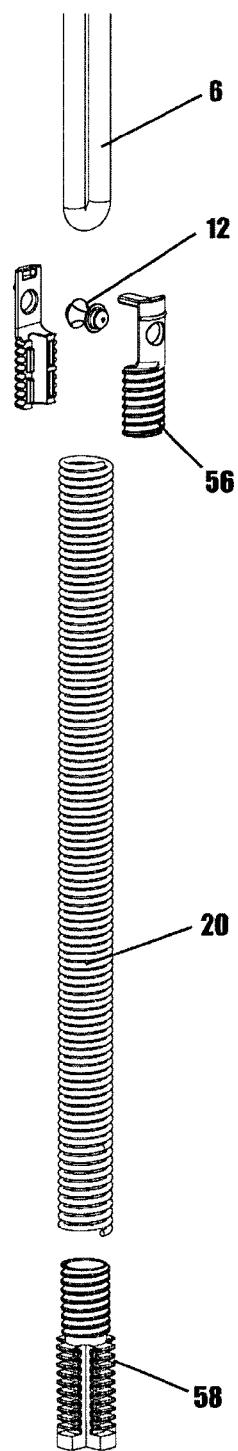
FIG. 17 is an exploded view of the guide pulley and return spring of the operating mechanism of FIG. 1.

Coaxial first and second guide sprockets 32,34 are located within the upper portion 3 of the housing 2, preferably arranged to be rotatable about a common horizontal axis arranged substantially parallel to the roller of the screen assembly. In the embodiment shown, each sprocket 32,34 has a circumferential channel 35 extending around the periphery thereof to define a pull cord guide path therein. Teeth or similar projections 37 (see FIG. 9) may be formed on the inner walls of the circumferential groove of each sprocket 32,34 for gripping the cord 6 therein. Such teeth or similar projections in the circumferential groove of each sprocket 32,34 may be offset from one another on opposite sides of the respective channel to define, between them, a convoluted or zig-zag guide path around the periphery of the respective sprocket, within which is received a respective portion of the pull cord 6 such that the pull cord 6 is gripped by the teeth 37. Alternatively, the teeth 37 of each channel 35 may be adapted to engage the beads of a beaded cord. The first and second guide sprockets may be arranged on separate, preferably parallel, axes.

A series of idler pulleys 36,38 may be provided above and below each guide sprocket 32,34 for guiding the passage of the pull cord 6 around each sprocket 32,34. A first portion of the pull cord 6 on a first side of the loop defined thereby passes around the periphery of the first sprocket 32, guided by respective idler pulleys 38,39. A second portion of the pull cord 6 on a second side of the loop defined thereby passes around the periphery of the second sprocket 34, guided by respective idler pulleys 36,38.

A one-way locking mechanism is preferably provided for selectively locking each of the first and second sprockets 32,34 to selectively prevent rotation thereof as the housing 2 is pulled downwardly with respect to the pulley assembly 8. The locking mechanism comprises first and second upwardly extending latching member 40,42, the latching members 40,42 being mounted within the upper portion 3 of the housing 2 and each having a respective head portion 44 adapted to engage circumferentially extending teeth 36 provided on an outer peripheral edge of a respective one of the first and second sprockets 32,34 to selectively lock the respective sprocket against rotation in at least one direction.

The head portion 44 of each latching member 40,42 is preferably arranged to engage a lower side of a respective tooth 36 of the respective sprocket 32,34. The lower end of latching member 40,42 is supported within a respective seat 47 formed within the upper portion 3 of the housing 2 to allow the respective latching member 40,42 to be tilted between a first position, wherein the head portion 44 of the respective latching member 40,42 engages the teeth 36 of the respective sprocket 32,34, and a second position, wherein the head portion 44 of the respective latching member is spaced from the respective sprocket 32,34, each latching member 40,42 being resiliently biased inwardly towards its first position by a suitable biasing means, such as a compression spring 45.

Each latching member 40,42 is arranged such that rotation of the respective sprocket 32,34 in a first direction is prevented by the abutment of the head portion 44 of the latching member 40,42 with the lower face of a tooth 36 of the respective sprocket 32,34 when the respective latching member is in its first position, while rotation of the respective sprocket 32,34 in a second, opposite direction causes the teeth 36 of the sprocket 32,34 to displace the latching member 40,42 outwardly allowing rotation of the sprocket 32,34 in said second direction, such that the respective latching member 40,42 operates in the manner of a one-way ratchet mechanism.

A control cam 46 is engaged with an upper end of the lower portion 4 of the housing 2, said control cam being located between the latching members 40,42 and being displaceable by means of rotation/twisting of the lower portion 4 of the housing 2 with respect to the upper portion 3 of the housing 2 to selectively urge the latching members 40,42 from their first to their second positions, against the action of the respective biasing means. The control cam 46 may be engaged by an upper part 50 of the lower portion 4 of the housing such that rotation of the lower portion 4 of the housing 2 with respect to the upper portion 3 of the housing 2 causes lateral displacement of the control cam 46 between a first operative position, wherein the first latching member 40 is displaced to its second position, and a second operative position, wherein the second latching member 42 is displaced to its second position.

In the embodiment shown in the drawings, the control cam 46 has an elongated central aperture 48 within which is received an upper end of the upper part 50 of the lower portion 4 of the housing 2, cooperating formations 55 being provided on an inner surface of said central aperture 48 of the control cam 46 and on the outer surface of the upper part 50 of the lower portion 4 of the housing such that rotation of the lower portion 4 of the housing 4 with respect to the upper portion 3 of the housing 2 causes lateral displacement of the control cam 46 in the manner of a rack and pinion drive.

One or more inwardly acting spring loaded balls 52 may engage detents or recesses 54 in the side of the upper portion 3 of the housing 2 to positively retain the position of the lower portion 4 of the housing 2 with respect to the upper portion 3 when the control cam is in each of its first and second operative positions.

When the control cam 46 is in its first operative position, such that the second latching member 42 engages the teeth 36 of the first sprocket 32, the first sprocket 32 is prevented from rotating by the latching member 42 during a downwards pull on the housing 2 away from the upper pulley assembly 8. A such, the first sprocket 32 grips the first side 40 of the pull cord 6, causing the pull cord 6 to act upon the upper pulley 7 to rotate the upper pulley 7 in a clockwise direction. At the same time, the guide pulley 12 is displaced from its first to its second position and the second sprocket 34 rotates to allow the second side 42 of the pull cord 6 to move out of the upper opening 4 of the housing 2.

When the housing 2 is released, the return spring 20 urges the guide pulley 12 downwardly within the lower portion 3 of the housing 2 and the housing 2 returns to its rest position in contact with the upper pulley assembly 8. During such return movement, the second sprocket 34 is free to rotate to allow the second side 42 of the pull cord 6 to move back into the housing 2. At the same time, the teeth 36 of the first sprocket 32 act against the head portion 44 or the second latching member 42 to displace the latching member 42 outwardly away from the teeth 36 such that the head portion 44 of the second latching member 42 rides over the teeth 36, allowing the first sprocket 32 to freely rotate such that the housing 2 can return to its rest position against the upper pulley assembly 8 without rotating the upper pulley 7.

When the control cam 46 is in its second operative position, such that the first latching member 40 engages the teeth 36 of the second sprocket 34, the first sprocket 32 is free to rotate in a clockwise direction while the latching member 49 of the second arm 46 prevents rotation of the second sprocket 34 such that the second sprocket 34 grips the second side 42 of the pull cord 6 during a downwards pull on the housing 2 away from the upper pulley assembly 8, causing the pull cord 6 to act upon the upper pulley 7 to rotate the upper pulley 7 in an anticlockwise direction. At the same time, the guide pulley 12 is displaced from its first to its second position and the first sprocket 32 freely rotates to allow the first side 40 of the pull cord 6 to move out of the upper opening 4 of the housing 2.

When the housing 2 is released, the return spring 20 urges the guide pulley 12 downwardly and the housing 2 returns to its rest position in contact with the upper pulley assembly 8. During such return movement, both the first and second sprockets 32,34 are free to rotate, the teeth 36 of the second sprocket 34 displacing the head portion 44 of the first latching member 40 outwardly, allowing the housing 2 to return to its rest position without rotating the upper pulley 7.

At least one locating projection 10 on the upper end of the housing 2 adjacent the opening 4 engages the upper pulley assembly 8 when the housing 2 is in its rest position in engagement with the upper pulley assembly 8, such that a twisting torque can be applied to the lower portion 4 of the housing 2 in order to adjust the position of the control cam 46.

The guide pulley 12 is secured to the upper end of the return spring 20 by means of a two part coupler 56 that includes a lower portion adapted to be screwed into an upper end of the spring. The lower end of the spring is coupled to a retainer 58 having an upper part adapted to be screwed into a lower end of the spring and a lower part having fir tree formations or similar securing means for securing the retainer 58 in place within the tubular lower portion 4 of the housing 2. Alternatively a fastener may be passed through the walls of the housing 2 to secure the retainer 58 in place.

As described above, in use, the upper pulley 7 of the screen assembly may be rotated in a desired direction by selecting the position of the control cam 46 in either of its first or second operative positions by rotation of the lower portion 4 of the housing 2 with respect to the upper portion 3 of the housing 2 and by pulling the housing 2 downwardly, such that the respective first or second side of the pull cord 6 is pulled downwardly by virtue of its engagement with the respective sprocket 32,34 and the locking of such sprocket 32,34 by the action of the respective latching member 40,42. When the housing 2 is released, it returns to its rest position in engagement with the upper pulley assembly 8 by virtue of the return spring 20 acting on the lower cord guide pulley 12 within the lower portion 4 of the housing 2.

In order to prevent the housing 2 from damaging the upper pulley assembly 8 during such return movement, shock absorbing and/or damping means may be provided for slowing the motion of the housing as it approaches its rest position.

The operating mechanism has been described above for controlling adjustment of a roller blind and it will be convenient to hereinafter describe the invention with reference to this particular application. It ought to be appreciated however that the mechanism is applicable to other window covering operating mechanisms where a looped pull cord, typically in the form of a chain, cord or elongate web, is used. These can include venetian blinds and vertical blinds.

The invention is not limited to the embodiment(s) described herein but can be amended or modified without departing from the scope of the present invention.

The invention claimed is:

1. An operating mechanism for a screen assembly having an elongate endless pull cord hanging from the screen assembly in a loop, said operating mechanism comprising a housing having an opening at an upper end whereby at least a lower end of the pull cord passes into the housing and is enclosed in the housing, the housing incorporating a guide for guiding passage of the pull cord through the housing, said guide incorporating a locking device adapted to selectively restrain a first or a second side of the loop defined by the pull cord within the housing as the housing is pulled downwardly with respect to the screen assembly, said guide comprising a first sprocket rotatably mounted within the housing adapted to engage a first portion of the pull cord on the first side of the loop defined thereby and a second sprocket rotatably mounted within the housing adapted to engage a second portion of the pull cord on the second side of the loop defined thereby, the locking device being adjustably configurable between a first state, wherein the locking device prevents rotation of the first sprocket as the housing is displaced downwardly with respect to the pull cord, causing the housing to pull on said first side of the loop defined by the pull cord, and a second state, wherein the locking device prevents rotation of the second sprocket as the housing is displaced downwardly with respect to the pull cord, causing the housing to pull on the second side of the loop defined by the pull cord, wherein the guide includes a cord retaining member engaging a lower end of the looped pull cord, said cord retaining member being moveable within the housing between vertically spaced first and second positions, said second position being above said first position, the cord retaining member being biased towards said first position by a biasing device, whereby the housing may be displaced downwardly with respect to the pull cord by virtue of upward movement of the cord retaining member between its first and second positions within the housing against the force of the biasing device.

2. The operating mechanism of claim 1, wherein said cord retaining member comprises a pulley around which the lower end of the loop defined by the cord passes.

3. The operating mechanism of claim 1, wherein said cord retaining member comprises a loop or hook engaging a lower end of the loop defined by the cord.

4. The operating mechanism of claim 2, wherein said biasing device comprises an elongate elastic member, said cord retaining member being attached to or being defined by a free end of said elongate elastic member.

5. The operating mechanism of claim 4, wherein said elongate elastic member comprises a tension spring, compression spring or an elastic band.

6. The operating mechanism of claim 1, wherein said housing comprises an upper part and a lower part, said lower part being rotatable with respect to said upper part in order to adjust the locking device between its first and second states.

7. The operating mechanism of claim 6, within which said first and second sprockets and said locking device are housed within the upper part of the housing and said pull cord retaining member and said biasing device are housed within said lower part of the housing.

8. The operating system of claim 6, wherein the upper part of the housing is adapted to engage the screen assembly such that a twisting torque applied to the lower part of the housing can be transferred to the screen assembly in order to facilitate control of the locking device.

9. The operating mechanism of claim 1, wherein said first and second sprockets are arranged coaxially in side by side relationship within the housing.

10. The operating mechanism of claim 1, wherein the first portion of the pull cord passes around the first sprocket from a first side of the housing to a second side of the housing, said second portion of the pull cord passing around the second sprocket from the second side of the housing to the first side of the housing.

11. The operating mechanism of claim 1, wherein each of said first and second sprockets is provided a guide channel provided around the outer periphery thereof for receiving said pull cord therein.

12. The operating mechanism as claimed in claim 11, wherein said guide channel of each sprocket is provided with circumferentially arranged formations to grip the pull cord.

13. The operating mechanism of claim 1, wherein said locking device is arranged to selectively engage teeth provided around each of said first and second sprockets.

14. The operating mechanism of claim 13, wherein the locking device comprises respective latching members, each latching member having a head portion adapted to engage the teeth of a respective one of the first and second sprockets when in a latching position.

15. The operating mechanism of claim 14, wherein the head portion of each latching member is shaped to engage a lower side of a respective tooth of the respective sprocket.

16. The operating mechanism of claim 14, wherein each latching member is moveable between a first position, wherein the head portion of the respective latching member engages the teeth of the respective sprocket, and a second position, wherein the head portion of the respective latching member is spaced from the respective sprocket, each latching member being resiliently biased towards its first position by a second biasing device.

17. The operating mechanism of claim 16, wherein each latching member is arranged such that rotation of the respective sprocket in a first direction is prevented by the abutment of the latching member with the teeth of the respective sprocket while rotation of the respective sprocket in a second, opposite direction causes the teeth of the sprocket to displace the latching member outwardly with respect to the sprocket against the force of said second biasing device, allowing rotation of the respective sprocket in said second direction.

18. The operating mechanism of claim 1, wherein a shock absorbing or damping device are provided for slowing movement of the cord retaining member as it approaches its first position under the action of the biasing device in order to prevent forceful impact of the housing with the screen assembly.

19. An operating mechanism for a screen assembly having an elongate endless pull cord hanging from the screen assembly in a loop, said operating mechanism comprising a housing having an opening at an upper end whereby at least a lower end of the pull cord is enclosed within the housing, the housing incorporating a guide for guiding passage of the pull cord through the housing, said guide incorporating a locking device adapted to selectively restrain a first or a second side of the loop defined by the pull cord within the housing as the housing is pulled downwardly with respect to the screen assembly, said guide comprising a first sprocket rotatably mounted within the housing adapted to engage a first portion of the pull cord on the first side of the loop defined thereby and a second sprocket rotatably mounted within the housing adapted to engage a second portion of the pull cord on the second side of the loop defined thereby, the locking device being adjustably configurable between a first state, wherein the locking device prevents rotation of the first sprocket as the housing is displaced downwardly with respect to the pull cord, causing the housing to pull on said first side of the loop defined by the pull cord, and a second state, wherein the locking device prevents rotation of the second sprocket as the housing is displaced downwardly with respect to the pull cord, causing the housing to pull on the second side of the loop defined by the pull cord, wherein the guide includes a cord retaining member engaging a lower end of the looped pull cord, said cord retaining member being moveable within the housing between vertically spaced first and second positions, said second position being above said first position, the cord retaining member being biased towards said first position by a biasing device, whereby the housing may be displaced downwardly with respect to the pull cord by virtue of upward movement of the cord retaining member between its first and second positions within the housing against the force of the biasing device, wherein the upper part of the housing is adapted to engage the screen assembly such that a twisting torque applied to the lower part of the housing can be transferred to the screen assembly in order to facilitate control of the locking device.

* * * * *